(12) United States Patent
Lorenz

(10) Patent No.: US 6,591,210 B1
(45) Date of Patent: Jul. 8, 2003

(54) CIRCUIT AND METHOD TO COMBINED TRIM AND SET POINT

(75) Inventor: Perry Scott Lorenz, Fort Collins, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 129 days.

(21) Appl. No.: 09/718,883

(22) Filed: Nov. 21, 2000

(51) Int. Cl.$^7$ ............................................... G01K 15/00
(52) U.S. Cl. ..................... 702/99; 702/130; 702/136; 323/313
(58) Field of Search ..................... 702/99, 130, 136; 236/46 R, 47; 323/311, 315, 907, 313; 700/275, 276, 277, 278

(56) References Cited

U.S. PATENT DOCUMENTS 4,228,511 A * 10/1980 Simcoe et al. ............... 700/278
5,821,741 A * 10/1998 Brokaw ....................... 323/311

* cited by examiner

Primary Examiner—John Barlow
Assistant Examiner—Hien Vo
(74) Attorney, Agent, or Firm—Merchant & Gould P.C.; Timothy P. Sullivan

(57) ABSTRACT

A method and apparatus is provided that combines bandgap trim, temperature sensor trim, comparator offset trim, and the setting of the temperature trip point. A comparator compares a bandgap reference voltage and temperature sensor voltage and trips the circuit when the temperature voltage is less than the bandgap reference voltage. The temperature voltage is combined with a compensating voltage to trim the circuit and set trip point. A method is provided to adjust the compensating voltage until the circuit trips at the any desired temperature.

17 Claims, 9 Drawing Sheets

B

| A | | 0 | 1 |
|---|---|---|---|
| | 0 | Normal/Clock in Data | Preview Trim/ Clock Out Register |
| | 1 | Eprom Loaded into Register | Write Eprom |

*Fig.3*

CIRCUIT AND METHOD TO COMBINED TRIM AND SET POINT

FIELD OF THE INVENTION

The present invention relates to analog and digital circuits. In particular, the present invention relates to a method and apparatus for combining trim and temperature trip point for a circuit.

BACKGROUND OF THE INVENTION

Accurate and stable components are needed for a wide variety of analog and digital applications. Some of these components include bandgap voltage references, temperature sensors and digital to analog converters (DACs). While each of these components is designed to be accurate each may vary slightly from the specifications. Trimming techniques are used to try to alleviate some of these discrepancies. Trimming many components, however, increases the complexity of the circuit.

Bandgap voltage references ideally provide a voltage having a zero temperature coefficient. The actual temperature characteristic, however, is a parabolic temperature curve due to nonlinearities of the temperature behavior of the transistors forming the bandgap, as well as to nonlinearity of the circuit resistance temperature coefficient. As a result, a bandgap voltage reference may not output the exact reference voltage as specified.

Similarly, the requirements and stability with respect to temperature sensors very from one sensor to the next. Variations in the transistor base-to-emitter voltages from lot to lot cause each sensor to measure the same temperature slightly differently.

Additionally, the temperature set point may vary due to manufacturing variables such as sheet resistance variations and threshold voltage matching errors and resistor matching errors. Further, some devices require many components for set point programming.

SUMMARY OF THE INVENTION

The present invention is directed at addressing the above-mentioned shortcomings, disadvantages and problems, and will be understood by reading and studying the following specifications.

In accordance with aspects of the present invention, an apparatus and method are provided combining bandgap trim, temperature sensor trim, comparator offset trim, and the setting of the temperature trip point.

In one aspect of the invention, a comparator compares a programmable reference signal and temperature signal and trips the circuit based on the comparison. In accordance with this aspect, the temperature signal is combined with a programmable reference signal to trim the circuit and set trip point. The programmable reference signal may be adjusted until the circuit trips at the desired temperature.

Another aspect of the invention includes a method for setting a temperature trip point for a circuit. A programmable offset signal generator is programmed to generate a program signal to trip the circuit at the desired trip temperature. The program signal trims a temperature sensor and a signal reference and a comparator offset.

Yet another aspect of the invention includes calculating slope from a single point measurement. In accordance with this aspect, a universal point is determined. The universal point is a constant value for all devices at absolute zero. The single point measurement is taken at a predetermined temperature. The slope is then calculated from the universal point and a single measurement.

BRIEF DESCRIPTION OF THE DRAWINGS

FIG. 3 is a diagram illustrating operation of a mode selector;

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. These embodiments are described insufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Figure 1:
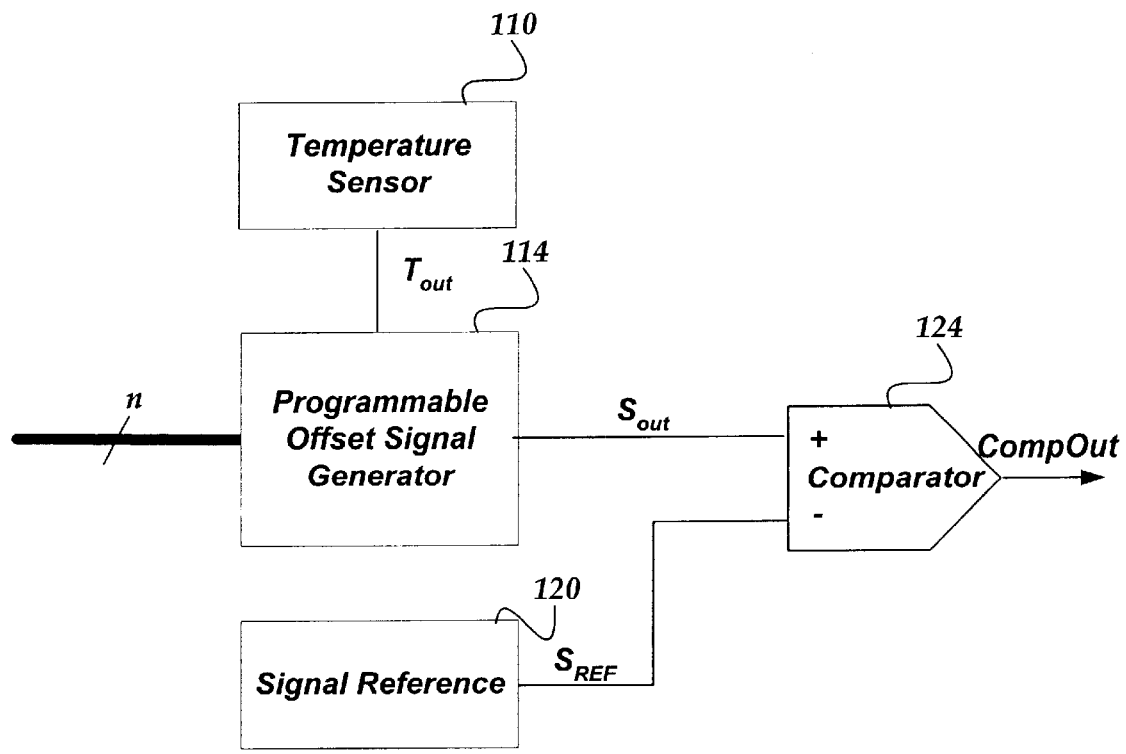
FIG. 1 is a schematic diagram of a trim and temperature set point system.

FIG. 1 shows a schematic of a combined reference signal trim, temperature sensor trim, and temperature trip point system. A temperature sensor (110) outputs a signal ($T_{out}$) representing a measured temperature. In one embodiment of the invention, temperature sensor 110 outputs a voltage. A programmable offset signal generator (114) has an input for receiving $T_{out}$, and an input for receiving n digital bits. Programmable offset signal generator 114 has an output that outputs a signal ($S_{out}$). The programmable offset signal generator may be programmed to adjust for inaccuracies in the temperature sensor, signal reference, as well as set a temperature trip point. The programmable offset signal generator may be many different circuits. For example, a DAC, a programmable current or voltage source, or some other similar device may be used. A comparator (124) has two inputs, a plus (non-inverting) input that receives $S_{out}$ and a minus (inverting) input that receives signal $S_{REF}$ generated from a signal reference (120). In one embodiment of the invention, the signal reference is a bandgap voltage reference. Comparator 124 trips depending on the values of $S_{out}$ and $S_{REF}$. In one embodiment of the present invention, when comparator 124 determines $S_{out}$ to be greater than $S_{REF}$, output CompOut of comparator 124 is set high. When comparator 124 determines $S_{out}$ to be less than $S_{REF}$, CompOut is set low. In another embodiment of the invention, when comparator 124 determines $S_{out}$ to be less than $S_{REF}$, output CompOut of comparator 124 is set high. When comparator 124 determines $S_{out}$ to be greater than $S_{REF}$, CompOut is set low.

Figure 2:
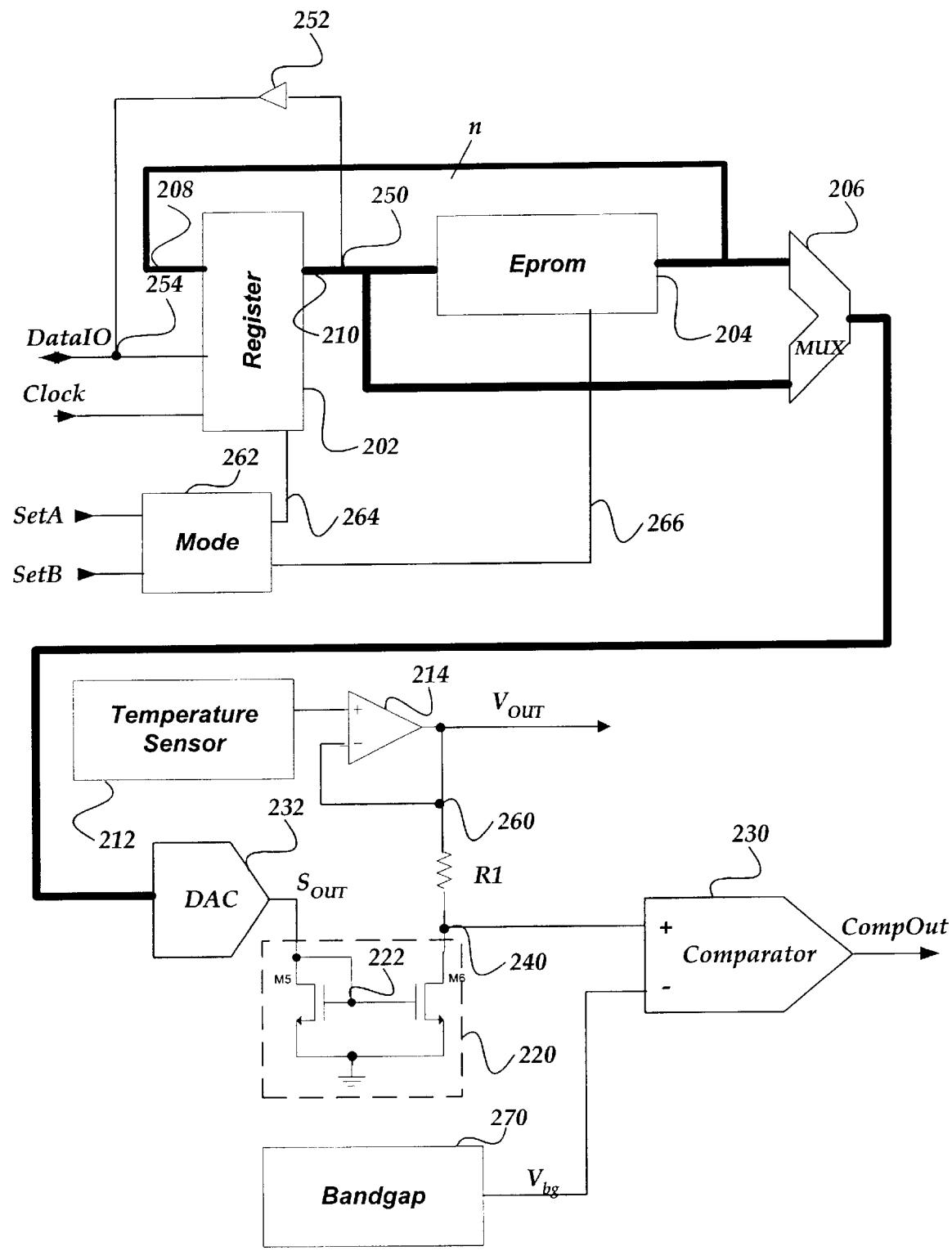
FIG. 2 is a schematic diagram of a trim and temperature set point circuit.

FIG. 2 is a schematic diagram of a trim and set point circuit. A register (202) having a unidirectional input clock signal and a bi-directional serial data IO signal receives, outputs, and stores n number of digital bits. Register 202 stores 13 bits, however, the register can store as many or as few bits as specified by the requirements of the application. Register 202 has a digital parallel bus input (208) and a parallel digital bus output (210) connected to an EPROM (204) and a MUX (206). Register 202 is used to temporarily store a binary code during a preview period while the trim code is being determined. EPROM 204 permanently stores the trim code after the trim code has been established during a preview period. Register 202 and EPROM 204 may be replaced by an EEPROM (not shown), a programmable logic array, or similar device. Similarly, register 202 may be any volatile data store capable of holding the trim code and EPROM 204 may be any non-volatile data store capable of holding the trim code.

A mode switch (262) controls operation of MUX 206 as well as register 202. Mode switch 262 has inputs SetA and SetB and outputs 264 and 266. Output 264 controls the mode of register 202 and output 266 controls the mode of EPROM 204. A tristate buffer 252 is located between node 250 and node 254. Tristate buffer is used to help control data flow in and out of register 202. During input mode into register 202 tristate buffer 252 is in high impedance. During output mode tristate buffer 252 drives the DataIO line.

MUX 206 can selectively read bits from EPROM 204 or register 202 and outputs the bits selected to a DAC (232). DAC 232 has nine (9) bits of resolution and 511 discrete steps, however, the DAC may be selected to have more or less resolution depending on the particular requirements of the application. DAC 232 converts the digital signal to an analog output signal $S_{OUT}$. A current mirror (220) receives $S_{OUT}$.

Transistors M5 and M6 having a common gate connection at node 222 form current mirror 220. The sources of MS and M6 are connected to ground. Transistor M5 forms a current source with a source connected to $S_{OUT}$. In one embodiment, M5 comprises four devices in parallel and M6 comprises two devices in parallel, wherein all of the devices have the same length and width. In another embodiment, current mirror 220 may be a programmable current mirror. For example, transistors may be arranged to provide a scalable current mirror.

Node 240 is coupled to a plus (non-inverting) input of a comparator (230) and $V_{bg}$ is coupled to a minus (inverting) input of comparator 230. Comparator 230 trips depending on node 240 and $V_{bg}$. In one embodiment of the invention, when comparator 230 determines node 240 to be greater than $V_{bg}$, output CompOut of comparator 230 is set high. When comparator 230 determines node 240 to be less than $V_{bg}$, CompOut is set low. In another embodiment, when comparator 230 determines node 240 to be less than $V_{bg}$, output CompOut of comparator 230 is set high. When comparator 230 determines node 240 to be greater than $V_{bg}$, CompOut is set low.

A bandgap voltage reference (270) outputs voltage $V_{bg}$. According to one embodiment of the invention, $V_{bg}$ is 450 mV. Bandgap reference circuits use the inherent characteristics of bipolar transistors to provide a voltage reference ($V_{BG}$) that is relatively independent of temperature.

A temperature sensor (212) is output to a buffer (214) and outputs an analog temperature voltage $V_{out}$. As the temperature increases $V_{out}$ decreases. In one embodiment of the invention, the temperature sensor (212) utilizes four junctions. Accordingly, each silicon junction voltage converges at the theoretical extrapolated bandgap voltage VGO of 1.205V at absolute zero. A resistor (R1) is connected between node 240 and node 260 and the resistor has a value of 872K ohms.

FIG. 3 is a diagram illustrating the logic table of a mode selector. When SetA and SetB are low (0) mode switch 260 (FIG. 2) is set normal and data may be clocked into register 202 (FIG. 2). When SetA is high (1) and SetB is low the value within EPROM 204 is loaded into register 202. When SetA is low and SetB is high data may be clocked out of register 202. When SetA and SetB are high EPROM 204 is written.

Figure 4:
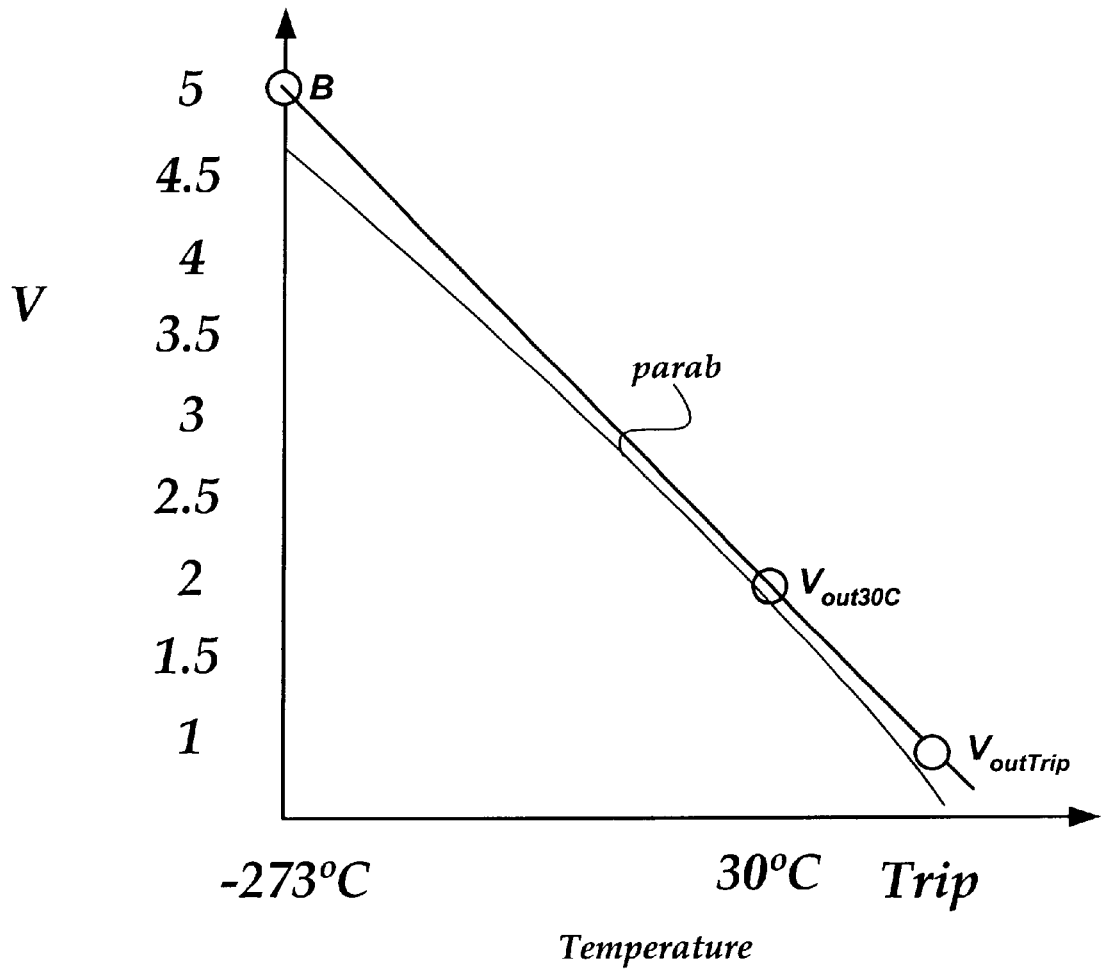
FIG. 4 is an exemplary diagram showing a graph of voltage vs. temperature.

FIG. 4 is an exemplary diagram showing voltage vs. temperature according to an embodiment of the invention. The value of the voltage at the desired trip temperature may be determined from the slope of known voltage values at associated temperatures. One voltage is a universal point occurring at absolute zero. Extrapolated to absolute zero (0° K, −273° C.) the voltage at this point is approximately 1.27V. Four junctions are used in temperature sensor 212 providing a B intercept voltage of approximately 5V. The exact value of the B intercept is determined at characterization and is then used as constant at manufacturing. A line is generated based on this B intercept and a voltage determined from a single voltage measurement at wafer-sort at a specific temperature. In one embodiment, when the measurement is made at 30° C., the measured voltage is 1845.1 mV for $V_{out30C}$. Since the B intercept is a constant for all the chips, and $V_{out30C}$ is measured, the slope and the trip temperature voltage ($V_{outTrip}$) can be calculated. Therefore, it is not necessary to measure $V_{out}$ at two different temperatures to calculate the slope. Measuring $V_{out}$ at two different temperatures in manufacturing is not practical or economical. From a single measurement of $V_{out}$, slope can be calculated, using this method. While the slope provided by the B intercept and $V_{out30C}$ provides a good estimate for $V_{outTrip}$, the slope is actually better characterized by a slight downward sloping parabola (parab) that is determined from chip characteristics determined at characterization as is known to those skilled in the art.

Figure 5:
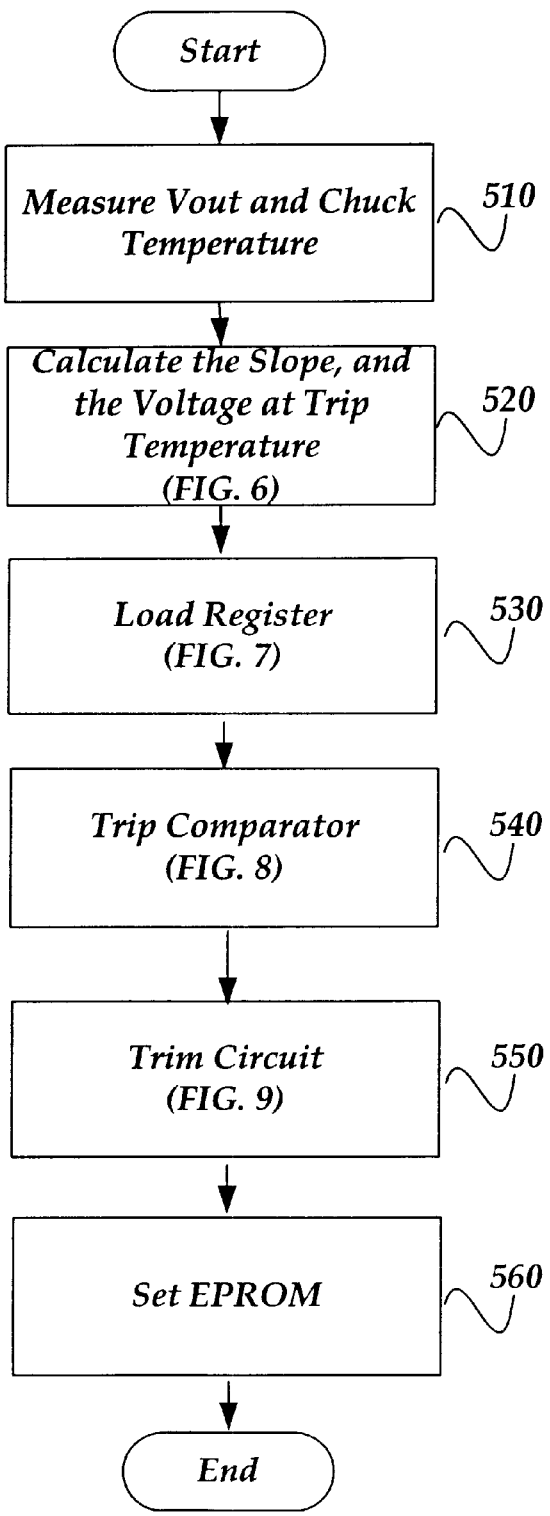
FIG. 5 is an overview flow diagram illustrating the operation a trim and temperature set point system.

FIG. 5 shows an overview flow diagram illustrating the operation of a trim and temperature set point system. When the logic flow moves to a block 510, a reference thermometer measures the chuck temperature, with the wafer sitting on the chuck, to make sure that the temperature is at a specified temperature, which is 30° C. in this embodiment. According to one embodiment of the invention, the signal is a voltage ($V_{out}$) representing the temperature. $V_{out}$ decreases as the temperature increases following the slope of the line, as illustrated in FIG. 4. Advancing to a block 520, the slope and the voltage, $V_{outTrip}$, at the desired trip temperature are calculated using $V_{out}$, B, and parab. Flowing to a block 530, the calculated trip value is converted to a binary representation and is loaded into a data store. In one embodiment, the data store is a register, such as register 202 shown in FIG. 2. Moving to a block 540, $V_{out}$ is driven down by an external driver. When the comparator is tripped, $V_{out}$ is measured and is recorded as $V_{outDriven}$ at the time the comparator trips. Transitioning to a block 550, the system is trimmed until the error between $V_{outDriven}$ and the calculated $V_{outTrip}$ is within an acceptable predetermined range. Next, the logic advances to a block 560 where the Eprom is permanently programmed in accordance with the trimmed binary code.

Figure 6:
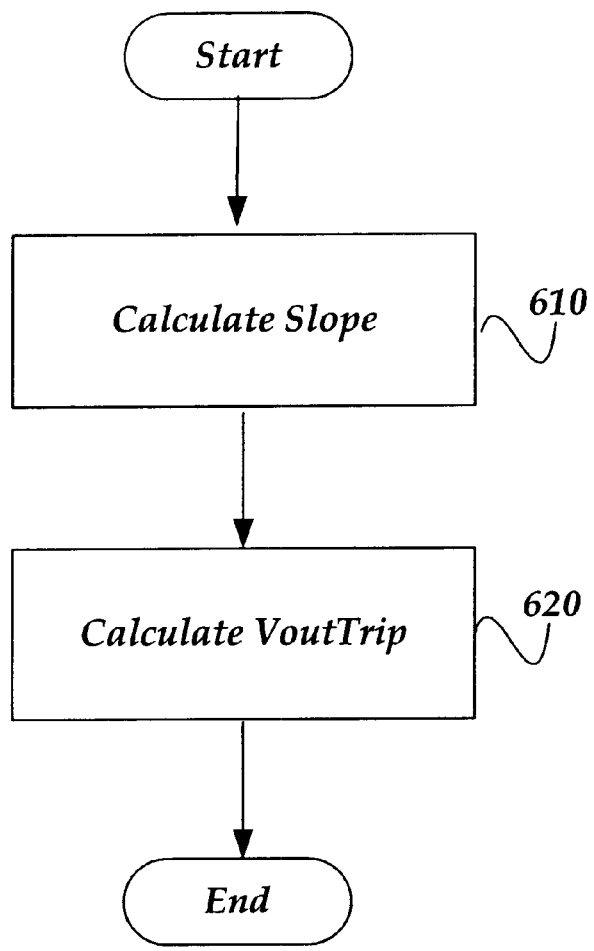
FIG. 6 is an operational flow diagram illustrating calculating trip temperature voltage.

FIG. 6 illustrates an operational flow diagram for calculating trip temperature voltage. As discussed above, before manufacturing, several constants are derived at characterization. These include, DAC resolution, bandgap reference voltage, the B intercept point, and parab. The logic flow moves to a block 610 where the slope of the voltage versus temperature is calculated by the following equation: slope= $(V_{out30C}-B)/Tk$ where $V_{out30C}$ is the measured voltage at 30° C., B is the intercept value at 0° K, and Tk is the temperature at 30° C. represented in Kelvin (block 610). For example, if $V_{out30C}$ is 1845.1 mV, B is 5044.5 mV, and Tk is 303° k then the slope determination is: slope=(1845.1 mV−5044.5 mV)/303° K=−10.55908 mV/° C.

The logic advances to a block 620, where the desired trip temperature voltage, $V_{outTrip}$, is calculated using: $V_{outTrip}=V_{out30C}+(Ttrip-Tcenter)slope+[(Ttrip-Tcenter)^2](parab)$. Ttrip is the desired trip temperature, Tcenter is the temperature when $V_{out30C}$ is measured, parab is determined at characterization, and slope is determined according to the operation performed at block 610. For example, if the desired trip temperature is 85° C. and parab=−3.44 uV/C², then $V_{outTrip}$=1845.1 mV+(85° C.−30° C.)(−10.55908 mV/° C.)+[(85°C.−30° C.)²](−3.44 uV/C²)=1253.95 mV.

Figure 7:
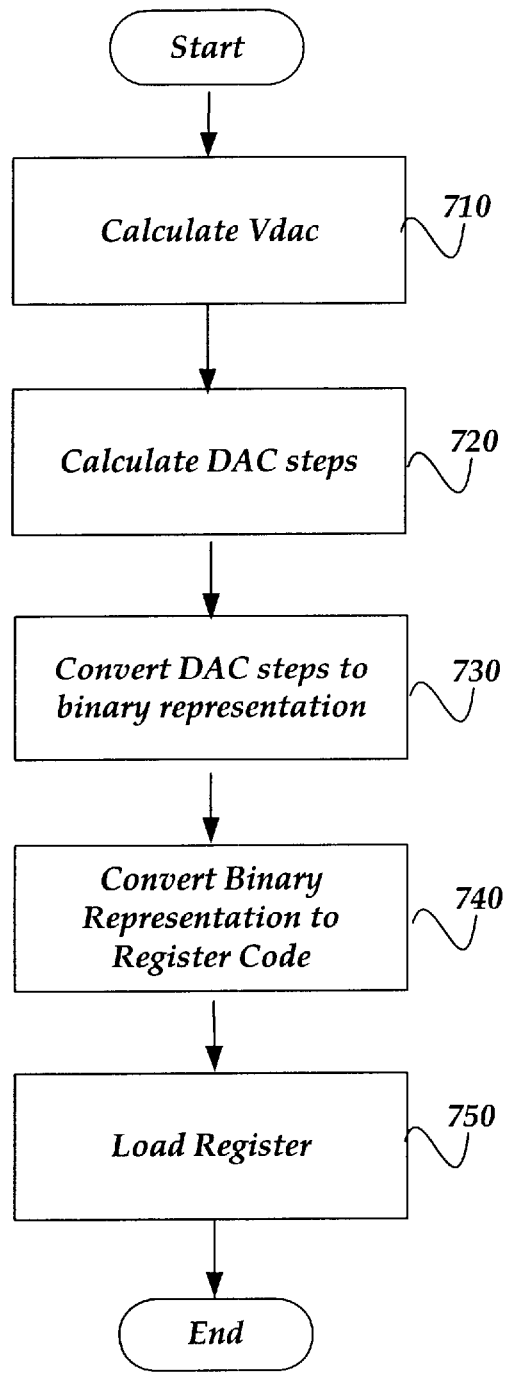
FIG. 7 is an operational flow diagram illustrating loading a data store.

FIG. 7 shows an operational flow diagram for loading a data store with a binary code. The logic flow advances to a block 710, where the value of $V_{DAC}$ is calculated. According to one embodiment, $V_{DAC}=V_{outTrip}-V_{bg}$ where $V_{outTrip}$ is calculated using the process illustrated in FIG. 6. Moving to a block 720, the logic calculates the number of discrete steps of the DAC by dividing $V_{DAC}$ by the resolution of the DAC. For example, if the DAC resolution is 4.42 mV/step, then DACsteps=(1253.95 mV−450 mV)/4.42 mV, or 182 steps. Transitioning to a block 730, DACsteps is converted to a binary representation. In one embodiment, the binary logic moves to a block 740 where the representation is converted to the specific lm26 code for the register. For example, if the code was strictly a binary representation then 182 is represented by 10110110. Next at a block 750, the binary representation is loaded into a data store. In one embodiment of the invention, the representation is loaded into register 232 (FIG. 2).

Figure 8:
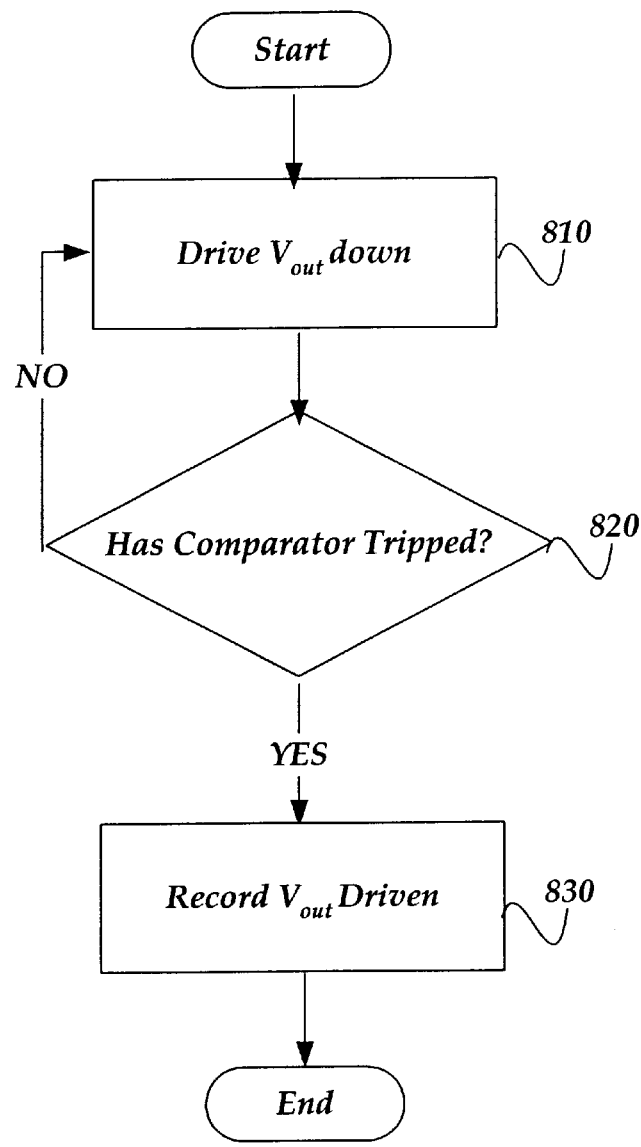
FIG. 8 is an operational flow diagram illustrating forcing a comparator to trip.

FIG. 8 illustrates an operational flow diagram for forcing a comparator to trip. When the code is loaded into the data store, DAC 232 (FIG. 2) outputs a signal into a current mirror that generates a current flowing in resistor R1 (FIG. 2). The logic flow moves to a block 810, where to trip the comparator, $V_{out}$ is driven down by an external driver (not shown). According to one embodiment of the invention, $V_{out}$ is driven down at the rate of 1 mV/ms. The logic flows to a decision block 820 and determines if the comparator has tripped. If affirmative, the logic moves to a block 830 where the analog temperature $V_{out}$ is recorded at the point the comparator trips and the value is stored as $V_{outDriven}$. Alternatively, if the comparator has not tripped, the voltage is continued driven down and the logic flow returns to block 810.

Figure 9:
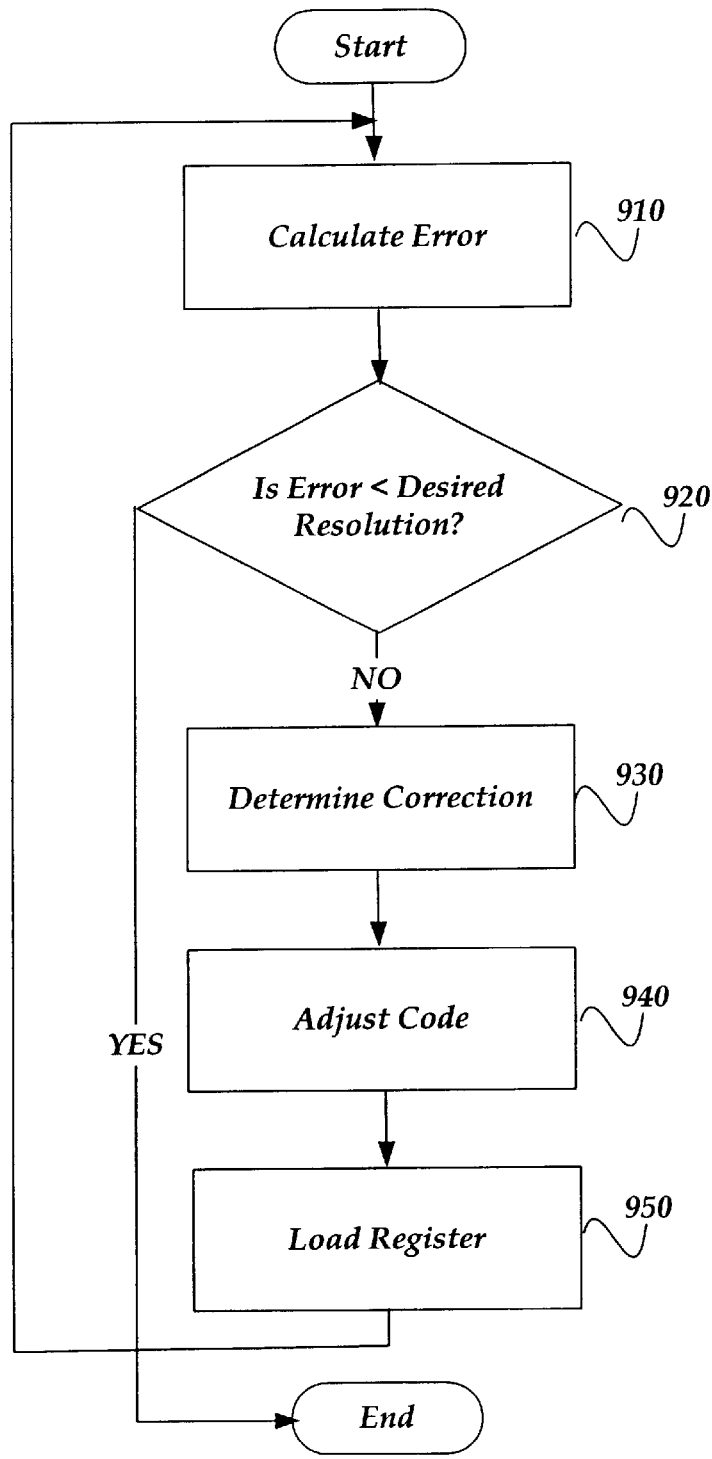
FIG. 9 is an operational flow diagram illustrating generating a trim code to set trim and temperature trip point according to the present invention.

FIG. 9 shows an operational flow diagram for generating a trim code to set trim and set temperature trip point. Before the trim code is stored in a non-volatile data store, the trim code is stored within a register during a preview period until the trimming and set point have been established. The logic flows to a block 910 where after recording $V_{outDriven}$, the error between $V_{outDriven}$ and the calculated $V_{outTrip}$ is calculated. If there is no error, $V_{outDriven}$, is the same as $V_{outTrip}$. According to one actual embodiment, error is calculated by: $V_{error}=V_{outTrip}-V_{outDriven}$. Transitioning to a decision block 920, the logic determines if the error is within an acceptable range. In one embodiment, if $V_{error}$ is less than ½ LSB where the LSB equals the resolution of the DAC, then the error is within an acceptable range. The error range can be any predetermined amount. For example, $V_{error}$ can be compared to be less than ¾ LSB, 1 LSB, or any other LSB. If the error is within the acceptable range the process ends. Alternatively, when the error is not within the acceptable range, the logic advances to a block 930 where the code is corrected. In one embodiment, the correction amount is determined by dividing the error by the resolution of DAC. Next, the logic flows to a block 940 where the binary code for the register is recalculated by: Code=old_code+correction (block 940). In one example of trimming a chip, the correction may be one step. As will be appreciated, the correction may be any amount.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for tripping at a temperature trip set point, comprising:
   (a) a temperature sensor that outputs a temperature signal representing a measured temperature;
   (b) a signal reference configured to output a constant reference signal;
   (c) a programmable offset signal generator that is configured to adjust for inaccuracies in the temperature sensor and the reference signal, that includes an input for receiving the temperature signal, an output that is configured to generate a program signal that trims the reference signal and the temperature sensor for tripping at a temperature trip point, the program signal and the temperature signal are combined to generate a trim signal; and
   (d) a comparator that trips based on a comparison between the reference signal and the trim signal.

2. The apparatus of claim 1, wherein the comparator trips when the trim signal is above the reference signal.

3. The apparatus of claim 1, wherein the comparator trips when the trim signal is below the reference signal.

4. An apparatus as in claim 1, wherein the programmable offset signal generator further comprises:
   (a) a data store for storing a trim code; and
   (b) a DAC that generates the program signal based on the trim code.

5. An apparatus as in claim 4, wherein the signal reference is a bandgap voltage reference.

6. An apparatus as in claim 5, further comprising a current mirror for mirroring the program signal.

7. An apparatus as in claim 4, wherein the data store further comprises:
   (a) a volatile data store for holding the trim code;
   (b) a non-volatile data store for holding the trim code; and
   (c) a selector coupled to the volatile data store and the non-volatile data store, the selector reading one of the volatile data store and the non-volatile data store and sending the trim code to the DAC.

8. A method for setting a temperature trip point for a circuit, comprising:
   (a) determining a trip temperature value, wherein the trip temperature value includes a trip temperature; and
   (b) programming a programmable offset signal generator to generate a program signal to trip the circuit at the trip temperature; wherein the program signal includes a program signal value that trims a temperature sensor and a signal reference and a comparator offset.

9. The method as in claim 8, wherein programming the programmable offset signal generator, further comprises:

(a) generating a reference signal that includes a reference signal value;

(b) driving a temperature signal that includes a temperature signal until a trip point;

(c) recording the temperature signal value at the trip point; and (d) determining when the difference between the recorded temperature signal value and determined trip temperature value is not within the predetermined error range, then re-programming the programmable offset signal generator to adjust the program signal until the difference is within the predetermined range.

10. The method of claim 9, wherein the trip point is when the temperature signal value is larger than the reference signal value.

11. The method of claim 9, wherein the trip point is when the temperature signal value is smaller than the reference signal value.

12. An apparatus for tripping at a desired temperature trip set point, comprising:

(a) a means for sensing temperature and outputting the temperature;

(b) a means for generating a reference signal;

(c) a means for generating a trim signal that compensates the sensed temperature and reference signal for tripping at a desired temperature trip point, and (d) a means for comparing the reference signal to the trim signal, and setting a state based on the comparison between the reference signal and trim signal.

13. An apparatus as in claim 12, wherein setting a state based on the comparison between the reference signal and trim signal further comprises setting a state when the trim signal is above the reference signal.

14. An apparatus as in claim 12, wherein setting a state based on the comparison between the reference signal and trim signal further comprises setting a state when the trim signal is below the reference signal.

15. An apparatus as in claim 12, further comprising means for mirroring the trim signal.

16. A method for calculating a slope from a single point measurement from which a trip temperature value may be determined, comprising:

determining a universal point, wherein the universal point is a constant value for all devices at absolute zero;

measuring a single measurement at a predetermined temperature; and calculating the slope from the universal point and the single measurement.

17. The method of claim 16, wherein the universal second point is proportional to the number of silicon junctions used in a temperature sensor.

\* \* \* \* \*